United States Patent
Presby (10) Patent No.: US 7,270,532 B2
(45) Date of Patent: Sep. 18, 2007

(54) SKIMMER TAB FORMER

(76) Inventor: David W. Presby, P.O. Box 617, Sugar Hill, NH (US) 03585

( * ) Notice: Subject to any disclaimer, the term of this patent is extended or adjusted under 35 U.S.C. 154(b) by 296 days.

(21) Appl. No.: 10/695,883

(22) Filed: Oct. 29, 2003

(65) Prior Publication Data

US 2004/0151547 A1    Aug. 5, 2004

Related U.S. Application Data (63) Continuation-in-part of application No. 09/524,238, filed on Mar. 13, 2000, now Pat. No. 6,461,078, which is a continuation-in-part of application No. 08/998,351, filed on Dec. 18, 1997, now Pat. No. 5,954,451, which is a continuation-in-part of application No. 08/526,437, filed on Sep. 11, 1995, now abandoned.

(60) Provisional application No. 60/124,706, filed on Mar. 15, 1999.

(51) Int. Cl.
    *B28B 1/48*    (2006.01)
(52) U.S. Cl. ................ 425/290; 425/325; 264/156
(58) Field of Classification Search .............. 425/290, 425/325; 264/154–156
    See application file for complete search history.

(56) References Cited

U.S. PATENT DOCUMENTS

| | | | | |
|---|---|---|---|---|
| 4,204,447 A | * | 5/1980 | Slaughterbeck | .............. 83/171 |
| 5,257,644 A | * | 11/1993 | Saha et al. | ................... 137/318 |
| 5,672,405 A | * | 9/1997 | Plank et al. | ................. 428/133 |
| 5,954,451 A | * | 9/1999 | Presby | ........................ 405/49 |
| 6,461,078 B1 | * | 10/2002 | Presby | ........................ 405/49 |
| 6,698,939 B2 | * | 3/2004 | Ishii et al. | ..................... 385/78 |

\* cited by examiner

*Primary Examiner*—Thomas B. Will
*Assistant Examiner*—Tara L. Mayo
(74) *Attorney, Agent, or Firm*—George W. Dishong (57) ABSTRACT

Systems for leaching liquid waste, particularly waste water. More particularly, a cylindrical conduit or pipe for use in leaching systems. Even more particularly, a cylindrical conduit which has apertures/skimmer tabs created either during the manufacture/forming/extrusion of the conduit or by punching after the forming of the conduit. Most particularly, is an apparatus and method for perforating corrugated plastic pipe or smooth walled plastic pipe while the pipe is in the process of extrusion. Further and even most particularly, an actuatable perforator/skimmer tab former which may be timely acutuated to cause the perforation of the wall of pipe wherein the plastic of the portion being perforated is semi-molten as, for example during the forming of the pipe or caused to be made semi-molten after formation of the pipe such as, for example, by heating of the acuatable perforator/skimmer former thereby causing the plastic to be rolled rather than cut creating thereby a perforation and skimmer tab of predetermined and selected geometry and dimension.

4 Claims, 4 Drawing Sheets

SKIMMER TAB FORMER

BACKGROUND OF THE INVENTION

This application is a continuation-in-part of application Ser. No. 09/524,238; filed on Mar. 13, 2000 which is based upon Provisional Application Ser. No. 60/124,706, filed on Mar. 15, 1999, NOW U.S. Pat. No. 6,461,078 B1, Issued Oct. 8, 2002, which is a continuation-in-part of application Ser. No. 08/998,351 filed on Dec. 18, 1997 Now U.S. Pat. No. 5,954,451; issued Sep. 21, 1999 which is a continuation-in-part of application Ser. No. 08/526,437 now abandoned, filed on Sep. 11, 1995.

FIELD OF THE INVENTION

This invention relates to systems for leaching liquid waste, particularly waste water. More particularly this invention relates to a specially designed cylindrical conduit or pipe for use in leaching systems.

Even more particularly the invention relates to cylindrical conduit which has apertures/skimmer tabs which may be created during the manufacture/forming/extrusion of the conduit or following such manufacture. The apertures/skimmer tabs may be created using pneumatics to actuate the perforator/skimmer tab former and punching the apertures and forming the skimmer tabs in cold plastic pipe, i.e., following the fabrication of the pipe.

Most particularly the invention is an apparatus, an actuatable perforator/skimmer tab former having three (3) edges which create a perforation and a skimmer tab (the perforator/skimmer tab) within cylindrical conduit and a method for perforating corrugated plastic pipe or smooth walled plastic pipe while the pipe is in the process of extrusion and which perforations are not cut from the material of the pipe but wherein the material is "rolled" or "transferred" to and made a part of the inner wall surface of the pipe and the pipe produced by this method.

Further and even most particularly the invention is an actuatable perforator/skimmer tab former which may be actuated to cause the perforation of the wall of pipe wherein the plastic of the portion being perforated is semi-molten as, for example during the forming of the pipe or caused to be made semi-molten after formation of the pipe such as, for example, by heating of the actuatable perforator/skimmer tab former thereby causing the plastic to be rolled rather than cut creating thereby a perforation and skimmer tab of predetermined and selected geometry and dimension.

The apparatus or system has at least one actuatable perforator/skimmer tab former, wherein the perforator/former is actuatable within at least one of a plurality of pipe-forming molds. There is preferably, a plurality of "mold-halves", a first mold-half and a second mold-half, which are advanced together as mold-halves by, for example, a chain and which mold-halves are closed creating a cavity wherein plastic is injected. The mold-halves advance and while the plastic is still in semi-molten state the perforator/former positioned into and a substantial part of a mold-half is timely activated and forms thereby a perforation and skimmer tab into the soft plastic. The perforator/former tip portion or portions is/are advanced into the plastic within the valley region (could also be done in any other portion of the conduit) the tip portion or what could be called the first cutter portion, pierces and cuts through the material along one edge and as the former is further advanced, two edges are cut and at the same time the plastic material within the cut region is pressed or rolled into the interior of the conduit while being substantially attached or "hinged" along the fourth or uncut edge. The fourth edge of the former has incorporated thereon a slight v-shape which causes a small amount of spreading of the plastic thereby inhibiting the skimmer tab from tending to move back toward the aperture from which the tab was created. Upon the timely withdrawing of the former there is created the aperture/skimmer tab combination. At the time the plastic is "set" the mold-halves are caused to open allowing the formed pipe, having apertures/skimmer tabs therein, to be removed from the molding machine.

The perforated pipe made using this apparatus and method is distinguishable from similar pipe because of the existence and inclusion of the perforations/skimmer tabs are because they may be made concurrent with the extrusion of the pipe. Further, they are not "cut out of the material" but are created by rolling the material inwardly improving the strength and enhancing the functioning of the pipe when used as septic waste pipe.

In summary, the instant invention allows for the use of perforators/skimmer tab formers on which can be made changes in the number of apertures, the size of aperture, configuration of aperture, angle of aperture, location of aperture, randomly positioned apertures, perforators/skimmer tab former may be activated or deactivated at will, giving full control to the manufacture and design of the pipe. Further, the number of perforators per mold can change and some molds may have none but at least one perforator will be positioned in one mold on the chain of molds in a corrugator machine. The shape of the perforator/former may be such as, for example, round, square, triangular or rectangular.

DESCRIPTION OF THE PRIOR ART

Many drainage pipes are produced from plastic materials, either by extrusion or blow molding, with the pipe being cut into lengths or rolled on a large drum to be carried in the field. To obtain high rigidity and maximum utilization of material, such drainage pipes are commonly corrugated with the corrugations extending circumferentially around the pipe. Corrugated plastic pipe is widely used for many types of domestic, agricultural, and industrial drainage and waste disposal systems.

preferably, drainage holes are positioned in the wall of the inner corrugation, or the so called valley portion, so that, when the pipe is ultimately buried in the earth, the drainage holes are not packed as tightly as would be the case if they were positioned in the outer corrugation, i.e., on the peaks. Having the perforations on the inner corrugation facilitates drainage from the pipe, but, for obvious reasons, complicates the formation of the perforations because of the difficulty in accessing from outside the pipe the valley portions of the pipe.

It would be advantageous to have corrugated pipe with grooves which are deeper and which grooves have sidewall which are substantially perpendicular to the bottom surface of the groove and perpendicular to the outer or top surface of the pipe. Because of the manner is which such pipe is perforated at the bottom surface of the grooves it has not been possible to make such a desirable corrugated pipe as taught herein. Applicant's U.S. pat. No. 5,606,786 Issued Mar. 04, 1997 for "Apparatus and Method for producing pipe and pipe produced Thereby" teaches a machine and method for producing such desirable pipe. The U.S. Pat. No. 5,606,786 is incorporated herein by reference thereto.

It should be further pointed out that suspended solids have plagued the septic system and waste water treatment industry more in the last ten (10) or more years than in previous years. The increase in the problem is due in part to the evolution and development of some of the modern day cleaners now make cleaning easier in that they cause grease and oil to dissolve into the water. The major problem with the septic tank is that the suspended solids in passing through the tank neither cool nor make contact at a slow enough pace to separate from the water.

Lint and fuzz has also been an ongoing problem for the septic tank to control. This material stays suspended in the septic tank liquid and normally passes through, remaining suspended in the effluent which subsequently also causes problems in the leach system connected with the septic tank.

Septic tanks generally available do not effectively provide for the removal, in a manner which does not effect the cost and the performance characteristics of the septic treatment system, of suspended solids that are typically found in septic tank liquid. It is important that the amount of suspended solids that leave the treatment tank be minimal so as not to adversely affect the subsequent treatment of the waste water/effluent. A leach field, for example, is adversely effected because the suspended solids will clog receiving layer and also adversely affect the absorption characteristics of the leach bed.

Currently there are designs and equipment that attempt the removal of the suspended solids. All of those known to the inventor of the now patented precipitation apparatus defined in U.S. Pat. No. 5,429,752 have failed to address the problem in an efficient manner because all the efforts attempt to "filter" the liquid. Filtration creates an additional set of problems. The filters can quickly become plugged slowing down or completely blocking the flow through of the liquid through the treatment tank. The filters are expensive and are costly to maintain. Applicant's patented precipitation apparatus greatly reduces the level of suspended solids exiting the treatment tank and entering the leach system.

It would be advantageous to have a treatment system which would include a leach system which would, more efficiently and effectively process the leachate or effluent from the septic tank or precipitation apparatus. The obvious consequences of such an improved fluid conducting conduit structure for use within a drainage field, would be longer life, less area needed to handle a specific amount of outflow of liquid and a cleaner and safer treated liquid returning to the environment. The improved fluid conducting conduit structure having the apertures/perforations as defined and claimed herein provides these advantages without a large increase in cost, does not require any additional maintenance and, in fact, requires less maintenance, is incorporatable into standard treatment designs and configurations, would be easily installed as new or replacements into existing and in-place leach fields and would provide flexibility to incorporate a variety of specially designed uses to result in a custom system based upon special or specific needs within the treatment system.

There is nothing currently available which satisfies these needs and objectives. However, the invention the apparatus, the method and the pipe herein defined and disclosed when in combination with the Patents incorporated herein by reference, does meet all of these objectives.

The following patents relate to the technology of the present invention, but none of them meets the objects of the presently disclosed and claimed invention. Additionally, none are as effective and as efficient as the instant apparatus and method.

U.S. Pat. No. 4,055,098 patent to Leloux for Manufacturing Corrugated Perforated Plastic Tubes discloses a device for manufacturing corrugated plastic pipe by subjecting an internally unsupported corrugated plastic tube, at a temperature between 30–70 deg. C., to the simultaneous action of at least two punching members in one or in two corrugations. The device uses at least two punching members, two of which are parallel and spaced a short distance from each other. The cutters are held in their non-operative positions by a spring, and are oblong steel strips which are resiliently secured at at least one end. The at least two cutters are active on either side of a symmetry plane which is substantially perpendicular to the longitudinal axis of the plastic tube. In order to obtain the desired number of perforations, optimally three pairs of cutters are disposed on the circumference of a sleeve that rotates. The device can also cut helically corrugated pipe. The device also has three 'areas' of each cutter that cut the pipe. The innermost points act first, then the sides act, and finally the outermost parts (which may be beveled) act. The temperature may vary but is below the softening temperature range of the plastic. It is a single puncturing device and is not multi-tipped.

The 4,421,810 patent to Rasmussen for Perforated Drainpipe and Method of Making Same discloses a perforated drainpipe made from at least one sheet of polymeric material that is formed in a tubular shape with adjacent edges spaced slightly apart, thereby creating a gap extending lengthwise along the now tubular sheet. To create 'perforations', at least one ribbon of polymeric material is helically wound around the tubular sheet, thus leaving perforations where parts of the gap are left uncovered by the helically wound ribbon(s) of polymeric material. The invention of this patent does not use any puncturing as the method for creating the perforations.

The 6,076,992 patent to Fukui et al., for Underdrain pipe discloses a perforated pipe with alternating segments of pipe having circular and square cross sections. Small water collecting holes may be formed in either the sectionally circular sections only, the sectionally square sections only, or both, or even only on the top or bottom of the pipe. The water collecting holes may be formed sequentially in a place where the pipe is moved to the outside of the mold, or after the pipe which has been molded is solidified. This patent is cited as an example of perforated pipe.

The 4,163,619 patent to Fales for Corrugated Drainage Tubing with Helically Arranged Drainage Openings discloses a thermoplastic corrugated drainage tube with peaks and valleys and a plurality of drainage openings "internally cut" about the circumference of each valley. The openings in successive valleys are helically arranged. The openings are helically arranged to avoid significant weakening of the tube. The perforating device includes two belts through which the corrugated pipe is run, and a shaft that supports a cutting tool. The tool may be run and rotated by a motor, but is rotatable by frictional engagement with the tube. The tool has a plurality, in one embodiment six, of cutters equidistantly spaced and projecting radially outward to engage the bottoms of the valleys. The tube is cut from the inside, not the outside of the pipe.

U.S. Pat. No. 5,606,786 to presby for producing pipe describes and discloses a method and apparatus for making corrugated plastic pipe with apertures in the valley portions of the corrugations. The device comprises a rotary cutter disposed within the pipe which cutter cuts the apertures from within the pipe.

U.S. Pat. No. 4,587,874 to Lupke, et. al. discloses a rotary punch. The rotary punch is a spindle carrying a cutting tool and a drive for rotating the spindle about its own axis while revolving the spindle about the pipe. The cutter periodically engages and perforates the pipe.

U.S. Pat. No. 4,204,447 to Slaughterbeck discloses an apparatus for perforating corrugated plastic pipe. The Slaughterbeck apparatus employs a plurality of reciprocally moving heated punches which punch radially into the pipe and are then removed to form perforations. The pipe is then translated to another position for the next punching step.

U.S. Pat. No. 4,180,357 to Lupke, et. al. discloses an apparatus and method for perforating pipe and method of producing part of such apparatus. The Lupke apparatus advances corrugated pipe along its axial path by rotatably driven lead screw members, the screw threading of which is in meshing engagement with the corrugations of the pipe. The lead screw members present outwardly directed cutters which are synchronized to simultaneously intersect the pipe thereby creating perforations.

U.S. Pat. No. 4,104,942 to Leloux discloses a device for manufacturing perforated plastic pipes. Disclosed is a device having at least one punching member, to which a velocity is imparted in the direction of conveyance of the plastic pipes. During the punching operation, the punching members remain substantially perpendicular with respect to the plastic pipes.

U.S. Pat. No. 3,916,763 to Maroschak discloses an apparatus for forming slits in tubes. The Maroschak apparatus an improved means of feeding a tube through a slitting station in a stepwise manner, wherein rotary cutting blades and moved into and out of cutting engagement with the tube between successive stepwise movements thereof.

U.S. Pat. No. 3,901,113 to Oltmanns, et. al. discloses a device to cut holes within the wave troughs of a corrugated tube, especially for drainage. The device employs tool supports geared with the waves of the tube. The tube and tool support are synchronized.

U.S. Pat. No. 3,877,831 to Maroschak discloses a method and apparatus for drilling holes in tubes. The tube is fed through a drilling station where one or more longitudinal rows are drilled in the wall of the tube by means of a corresponding number of rotating drill bits. The drilling station includes a separate drilling head for forming each row of holes. Each of the drilling heads is rotated in timed relation to the movement of the tube so as to drill holes therein without interrupting or retarding the movement of the tube.

U.S. Pat. No. 3,831,470 to Maroschak discloses a method and apparatus for forming slits in tubes. Maroschak discloses intermittently feeding the tube through a slitting station in a stepwise manner and moving a plurality of rotating cutting blades which encircle the path of travel of the tube into cutting engagement with the tube between successive stepwise movements. The apparatus includes a pair of rotary feed members which engage portions of the tube closely adjacent sets of rotary cutting blades arranged around the path of travel of the tube, and means for imparting stepwise movement to the tube in timed relation to the inward and outward movements of the cutting blades.

U.S. Pat. No. 3,824,886 to Hegler discloses an apparatus for cutting apertures in tubes. The Hegler apparatus employs means for revolving a cutter about the pipe to be cut in cooperation with a means for moving the cutting surface in an epitrochoid path as it passes through the exterior surface.

U.S. Pat. No. 3,698,222 to Blake discloses a perforating machine. The Blake machine employs a rotating punch and die roll means in cooperation with corrugated roll means. The punch roll being formed of disks separated by spacers.

The patents noted herein provide considerable information regarding the developments that have taken place in this field of technology. Clearly, the present invention provides many advantages over the inventions noted above. Again it is noted that none of the inventions listed above creates the apertures during the extrusion or pipe-forming process and does so by piercing and causing the subsequent "rolling" of the soft plastic into and onto the interior facing wall of the pipe being formed.

Even more particularly, the invention is particularly useful in combination with: (A) the septic tank maze apparatus defined and described in Applicant's U.S. Pat. No. 5,429,752 Issued Jul. 04, 1995, (B) with the use of multiple layers of fabric of varying deniers defined and described in "A METHOD AND APPARATUS FOR USING MULTI-LAYER MATERIAL IN PROCESSING OF SEPTIC EFFLUENT AND WASTEWATER" U.S. Pat. No. 5,954,451; Issued Sep. 21, 1999 and with the pipe constructions defined and described in "PLASTIC SEWAGE PIPE", U.S. patent application Ser. No. 09/524,238; filed Mar. 13, 2000, Based On Provisional Application Ser. No. 60.124,706, Filed Mar. 15, 1999. These patents are incorporated herein by reference thereto.

SUMMARY OF THE INVENTION

This invention relates to systems for leaching liquid waste, particularly waste water. More particularly this invention relates to a specially designed cylindrical conduit or pipe for use in leaching systems.

Most particularly the invention relates to cylindrical conduit which has specially configured ridges, channels and grooves over which may be laid either single or multiple layers of fabric. And further the corrugated pipe disclose herein may have slots or slits or V-grooves in and on the various portions of the pipe such as the outer-facing surface of the ridges, the end portion of the ridges, the side wall of the groove or through the bottom portion of the groove, the pipe may be used to effectively process effluent in a leaching system. Yet more particularly the invention is to provide an apparatus for use within a drainage field, which drainage field is in combination with disposal and irrigation systems used in treatment of fluids and dispersal of fluids, the structure comprising: corrugated conduit having an outer surface of a plurality of peaks and valleys and a plurality of skimmer tabs each skimmer tab created using a skimmer tab former, the skimmer tab former perforates then cuts along 3 of 4 edges, and the skimmer tab former further causes the cut portion to be "rolled" inwardly and within the conduit the cut portion rolled inwardly becoming the skimmer tab substantially attached at the uncut 4th edge. The fourth edge of the former has incorporated thereon a slight v-shape which causes a small amount of spreading of the plastic thereby inhibiting the skimmer tab from tending to move back toward the aperture from which the tab was created.

The skimmer tabs/perforations/apertures are each located circumferentially within at least some or all of the valleys of the conduit. Each of the plurality of skimmer tabs/perforations provides flow communication from conduit interior to conduit exterior. It is important to note that with this process for the creation of apertures, there is no waste product created as the skimmer tab is formed using the material from the perforation. A still further object of the invention is to provide the improved fluid conducting conduit structure for use within a drainage field using corrugated conduit having an outer surface of a plurality of peaks and valleys and having a plurality of skimmer tabs/perforations located circumferentially within at least some or all valley regions. The corrugated conduit is preferably comprised of plastic material and wherein each of the peaks have a plurality of dents substantially equally spaced around each peak resulting in a reduction of outer surface area of the conduit contacting the first layer of fabric. The apertures/skimmer tabs may be created using pneumatics to actuate the perforator/skimmer tab former and punching the apertures and forming the skimmer tabs in cold plastic pipe, i.e., following the fabrication of the pipe. Even more particularly the invention relates to cylindrical conduit which has apertures/skimmer tabs/perforations created during the manufacture/forming/extrusion of the conduit.

Most particularly the invention is an apparatus and method for perforating corrugated plastic pipe or smooth walled plastic pipe while the pipe is in the process of extrusion and which perforations are not cut from the material of the pipe but wherein the material is "rolled" or "transferred" to and made a part of the inner wall surface of the pipe and the pipe produced by this method. Further and even most particularly the invention is an actuatable perforator/skimmer tab former which may be sequentially and timely actuated to cause the perforation along three sides of the tab thereby formed of the wall of pipe wherein the plastic of the portion being perforated is semi-molten as, for example during the forming of the pipe or caused to be made semi-molten after formation of the pipe such as, for example, by heating of the actuatable perforator/skimmer tab former thereby causing the plastic to be rolled rather than cut creating thereby a perforation/skimmer tab of predetermined and selected geometry and dimension. The apparatus has at least one actuatable perforator/skimmer tab former, wherein the perforator/skimmer tab former is preferable an actuatable perforator/skimmer tab former within at least one of a plurality of pipe-forming molds. There is preferably, a plurality of "mold-halves", a first mold-half and a second mold-half, which are advanced together as mold-halves by, for example, a chain and which mold-halves are closed creating a cavity wherein plastic is injected. The mold-halves advance and while the plastic is still in semi-molten state the perforator/skimmer tab former positioned into and a substantial part of a mold-half is timely activated and forms thereby a perforation/skimmer tab into the soft plastic. The perforator/skimmer tab former tip portion or portions is/are timely withdrawn leaving a perforation and skimmer tab of selected geometry and having strengthening "inwardly rolled" edges protruding into the pipe cavity. At the time the plastic is "set" the mold-halves are caused to open allowing the formed pipe, having the skimmer tab/aperture, to be removed from the molding machine. The perforated pipe made using this apparatus and method is distinguishable from similar pipe because the perforations are made concurrent with the extrusion of the pipe and the perforations are not "cut out of the material" but are created by rolling the material inwardly improving the strength and enhancing the functioning of the pipe when used as septic waste pipe.

In summary, the instant invention allows for the use of perforators on which can be made changes in the number of aperture, the size of aperture, configuration of aperture, angle of aperture, location of aperture, randomly positioned apertures, perforators may be activated or deactivated at will, giving full control of the perforators/skimmer tab former to the manufacture and design of the pipe. Further, the number of perforators per mold can change and some molds may have none but at least one perforator will be positioned in one mold on the chain of molds in a corrugator machine.

An object of the invention is to provide an apparatus easily and economically maintainable and which is effective to process liquid outflowing from a septic tank or treatment tank and cause the outflow liquid or effluent to be more efficiently and more effectively processed and the processed liquid returned to the ground water system.

A further object of the invention is to provide an apparatus which is easily and economically adaptable to meet specific design criteria which are based upon types and quantity of suspended solids found or expected in a treatment system and which when in use, will increase the life expectancy of a leaching system and reduces the normal area of a leach system.

A yet still further object of the invention is to provide an apparatus for use within a drainage field, which drainage field is in combination with disposal and irrigation systems used in treatment of fluids and dispersal of fluids, the structure comprising: corrugated conduit having an outer surface of a plurality of peaks and valleys and a plurality of perforations/skimmer tabs which are created as taught and claimed herein, and located circumferentially within at least some or all of the valleys. Each of the plurality of perforations provides flow communication from conduit interior to conduit exterior. Each of the skimmer tabs associated with each of the apertures or perforations effectively skim oils, greases and other suspended material within the leachate substantially away from the apertures thereby improving the performance of the conduit. There is also preferably a first layer of fabric wrapped around the outer surface of the corrugated conduit; and at least one additional layer of fabric overlaying the first layer with, the first layer and each of the at least one additional layer of fabric having a predetermined denier and predetermined thickness. The predetermined denier of the first layer is greater than the predetermined denier of each of the additional layers of fabric and each of the additional layers has a denier different from each of the additional layer adjacent thereto. The predetermined denier and thickness is dependent upon the fluid being treated and dispersed and the drainage field size, composition and geometry. The first layer and the at least one additional fabric layers are formed from an unstructured assemblage of fibers. The unstructured assemblage of fibers is typically supported by an outer sheeting. Oils, greases and chemicals contained in the fluids to be treated and entering within the fluid conducting conduit structure are entrapped within at least one of the first layer and the at least one additional layer of fabric on the unstructured assemblage of fibers. The unstructured assemblage of fibers provides a surface area wherein consequent biodegradation of the oils, greases and chemicals takes place permitting treated fluid to pass omnidirectionally through the unstructured assemblage of fibers and subsequently leach into the ground.

A primary object of the invention is to provide an improved fluid conducting conduit structure for use within a drainage field, which drainage field is in combination with disposal and irrigation systems used in treatment of fluids and dispersal of fluids, using conduit having an outer surface and having a plurality of apertures/perforations created as taught and claimed herein, in the outer surface to the interior of the conduit and located at predetermined locations along an axis of the conduit, further comprising; a first layer of fabric wrapped around the outer surface of the conduit; and at least one additional layer of fabric overlaying the first layer with, the first layer and each additional layer of fabric having a predetermined denier and predetermined thickness. The predetermined denier of the first layer is coarser than the predetermined denier of each additional layer of fabric. While the predetermined denier of the first layer being greater than the predetermined denier of each additional layer of fabric, each additional layer has a denier different from each additional layer adjacent thereto. The predetermined denier and thickness is dependent upon the fluid being treated and dispersed and the drainage field size, composition and geometry. At least one of the layers of the multilayer fabric is/are formed from an unstructured assemblage of fibers. The unstructured assemblage of fibers are supported by an outer sheeting. Oils, greases and chemicals contained in the fluids to be treated and entering within the fluid conducting conduit structure are entrapped within at least one of the first layers and at least one additional layer of fabric and particularly on the unstructured assemblage of fibers. The unstructured assemblage of fibers provides a large surface area whereon consequent biodegradation of said oils, greases and chemicals takes place permitting treated fluid to pass omnidirectionally through the unstructured assemblage of fibers and subsequently leach into the ground.

Yet another primary object of the invention is to provide the improved fluid conducting conduit structure having the apertures/perforations created as taught and claimed herein, where the outer surface has a plurality of dents and detents spaced around outer surface resulting in a reduction of the outer surface area contacting the first layer of fabric.

A further object of the invention is to provide the improved fluid conducting conduit structure for use within a drainage field using corrugated conduit having an outer surface of a plurality of peaks and valleys and having a plurality of the perforations created as taught and claimed herein an located circumferentially within at least some or all valley region. The corrugated conduit is preferably comprised of plastic material and wherein each of the peaks have a plurality of dents substantially equally spaced around each peak resulting in a reduction of outer surface area of the conduit contacting the first layer of fabric.

A particular object of the present invention is to provide a method for producing the pipe having apertures of selected geometries, the apertures being created by use of at least one actuatable perforator/skimmer tab former, wherein the perforators are timely actuated during the molding of the plastic pipe the apertures and the skimmer tabs created without the removal of any substantial portion of the material of the pipe and creating thereby perforations having discontinuities directed inwardly toward the centerline of the pipe. The apertures/skimmer tabs may also be created using pneumatics to actuate the perforator/skimmer tab former and punching the apertures and forming the skimmer tabs in cold plastic pipe, i.e., following the fabrication of the pipe.

A still further object of the present invention is to provide a perforated pipe made by the processes of the present invention. The perforated pipe made by the processes of the present invention is distinctive in several aspects. The perforated pipe may have a non-linear or spiral pattern of perforations, thus making the pipe stronger than similar pipes with linear patterns of perforations. Also, the pipe perforated by the processes of the present invention may also have distinctive perforations. The perforations and the consequentially formed skimmer tabs may be either round, slotted, triangular, oblong, square or have any other geometry which may enhance the performance of the conduit for specific applications.

A yet still further object of the present invention is to provide an actuatable perforator/skimmer tab former which may be sequentially and timely actuated to cause the perforation of the wall of pipe to be hinged along one edge and rolled inwardly creating thereby the skimmer tab of the invention and wherein the plastic of the portion being perforated is semi-molten as, for example during the forming of the pipe or caused to be made semi-molten after formation of the pipe such as, for example, by heating of the actuatable perforator thereby causing the plastic to be rolled rather than cut creating thereby a perforation of predetermined and selected geometry and dimension.

These and further objects of the present invention will become apparent to those skilled in the art to which this invention pertains and after a study of the present disclosure of the invention.

DESCRIPTION OF THE PREFERRED EMBODIMENTS

The following is a description of the preferred embodiment of the invention. It is clear that there may be variations in the size and the shape of the pipe, in the materials used in the construction and in the orientation of the perforators, the molds, the manner of moving the molds, the manner of actuating the perforators/skimmer tab former and the geometries of the apertures. However, the main features are consistent and are:
1) The pipe is held in place by the mold-halves while the pipe is being perforated/punched;
2) By creating the apertures during the pipe forming process, the pipe does not deform as a consequence of punching, piercing, cutting etc.;
3) The need for guides or holders is eliminated because of the fixing in position of the perforators/skimmer tab former into the mold-halves;
4) No heating is necessary because plastic is still warm resulting thereby in a faster process;
5) The number of holes per valley or per length can be easily changed by removal of perforators/skimmer tab former or by the control of the perforators/skimmer tab former which are actuated and sequentially actuated;
6) Creating the aperture in the pipe at the time of molding process save time by reducing substantially the number of steps in the processing of perforated pipe which basic steps were to A) Form the pipe, B) Reheat, C) punch holes, D) Feeding in and out of the punch machine, E) Alignment of the hole i.e., align with corrugation of the pipe;
7) The method and apparatus of the invention allows further for rapid and easy change of the pattern of apertures, change of the number of apertures needed or desired, if advantageous, the hole geometries may be varied and combined in one valley or in sequential valleys of the pipe;
8) The reaction time of the perforators/skimmer tab former is fast;
9) The manor of creation of the aperture/skimmer tabs leaves strengthening "inwardly rolled" edges protruding into the pipe cavity which allows more storage of sludge inside pipe and provides additional strength to the pipe relative to apertures created by removal of material;
10) The perforators/skimmer tab former and the manor of mounting onto the mold and mold-halves permits the creation of apertures valleys as well as on the tops of corrugations, i.e., on the peaks, further, because of the invention perforations can be created in tight valleys without cutting sidewalls and losing any substantial amount of strength of pipe, the holes do not weaken the pipe because it is done when pipe is being formed, cutting of apertures can tear or crack pipe at the point of cutting after cooled and formed as compared with perforating according to the present invention—creating the apertures in the forming mold while the material of the pipe still hot, flaring, i.e., the forming of the inwardly rolled edges at the perforation will also strengthen the pipe at that point of the hole due, at least in part, to extra plastic build up and after full curing the extra material will add strength and also resist tearing;
11) The perforators/skimmer tab former and the manor of mounting onto the mold and mold-halves permits the positioning at an angle to the pipe and any location on the pipe on smooth wall or corrugated;
12) Actuation of the perforators/skimmer tab former can be achieved with the use of "slide bars" or "wheels" or any other method that depresses the parts of the perforator at a set time and at proper levels;
13) Levers may be used to deploy punches in different locations on the mold section;
14) perforators/skimmer tab former may be heated to perforate pipe post manufacture of the pipe; and
15) The methods and systems of the present invention may additionally be used with drainage pipe and clearly may be used with or without fabric covering whether the fabric covering is single or multi-layered.

It is clear that in the description provided below relative the the aspects of the technology of septic effluent processing and more particularly to the creation of perforations in plastic conduit/pipe which are described in FIGS. 1–6, everything described herein is applicable and advantageous for use with the corrugated pipe as disclosed in "PLASTIC SEWAGE PIPE", U.S. patent application Ser. No. 09/524,238; filed Mar. 13, 2000.

Further, it should be noted that the machines which make corrugated pipe are commonly called corrugators. Those skilled in the art are well informed regarding the operation of such machines. Further, those skilled in the art are also well aware of the manner in which the "corrugators" work and fully understand how the apparatus of the present invention can be incorporated into the "corrugators" to perform the functions as disclosed herein. The mold-halves are custom designed to meet the specifications of the pipe and to include means for retaining and operating the perforators/skimmer tab formers.

While the invention described in most detail is related to creation, during the manufacture of the pipe, of the apertures having the advantages noted herein, it is important to note that it is clearly possible to create these advantageous perforations/skimmer tabs in pipe that has been manufactured with or without conventional apertures. One method would be to use substantially the perforators described and claimed herein and assembled on a jig to position one or a plurality of such perforators and pneumatically actuate the perforators/formers to basically punch the cold plastic pipe and create the combination aperture/skimmer tab. There could further be provided a means for heating and consequently softening that portion of the plastic pipe in which the apertures/skimmer tabs are to be formed. Such means for heating could readily be a means for heating the perforator/former portion which creates the perforation or heat could be applied directly to that portion of the pipe being perforated before the perforator is actuated.

Reference is now made to FIGS. 1–6 all of which illustrate by sketch particular embodiments and features of the present invention. The numerals associated with all of many portions illustrated in the drawing figures and some of the various portions and features will not be identified herein and need not be considered relevant. Such identification is not needed to adequately disclose the features of the invention and one of ordinary skill in the related field will fully understand the relationships between the various components and the relative associated functions.

However, the following numerals are applied to those features and components of the invention and are identified substantially in the following manner:

6—fabric cover;
6A—first layer of fabric;
6B—second layer of fabric;
8—cylindrical conduit/pipe with corrugation surface and multilayer fabric thereon;
8a—cylindrical conduit/pipe with corrugation surface and various forms of geometric opening or surfaces on each of the peaks have a plurality of dents substantially equally spaced around each peak resulting in a reduction of outer surface area of the conduit contacting the first layer of fabric;

8b—cylindrical conduit/pipe with corrugation surface and a form of geometric opening or surfaces on each of the peaks;
10—pipe skimmer;
12—pipe aperture having skimmer tab 14;
14—skimmer tab;
16—skimmer hinge edge;
20—perforator/skimmer tab former 1st embodiment;
21—perforator/skimmer tab former 1st edge;
22—perforator/skimmer tab former 2nd edge;
23—perforator/skimmer tab former roll surface;
25—perforator/skimmer tab former V-spreader;
26—perforator/skimmer tab former role edge/4th edge;
30—perforator/skimmer pipe production mold with at least one skimmer tab former;
30A—perforator/skimmer pipe production first mold half with at least one skimmer tab former;
30B—perforator/skimmer pipe production second mold half with none or with any number of skimmer tab former;
31—pipe skimmer actuator system includes pipe skimmer 20, shaft 34 and spring 32 attachable and actuatable on pipe production mold 30;
32—spring around shaft 34 which provide controlled pressure and force to skimmer tab former 20 attached thereto; and
34—actuator shaft attached to the skimmer tab and configured onto mold and positioned to create the pipe skimmer when pressure and force is provided to the shaft.

FIGS. 1–4 collectively schematically illustrate the conduit having the aperture/skimmer tabs formed in the valley regions of the corrugated conduit.

FIGS. 5B, 5C, 5D and 6 collectively schematically illustrate the actuatable perforator/skimmer tab former of the invention.

Figure 1:
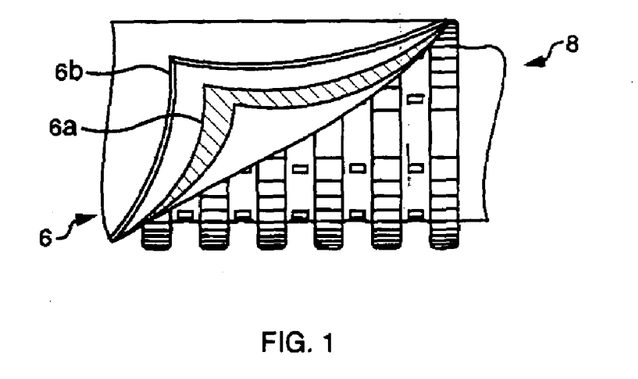
FIG. 1 is a schematic illustration of the invention showing multilayer fabric of varying deniers wrapped around corrugated pipe with a portion of the fabric cut-a-way thereby disclosing a plurality of dents or detents on the peaks of the pipe and disclosing a plurality of skimmer tabs/perforations in the valleys of the pipe.
Figure 2:
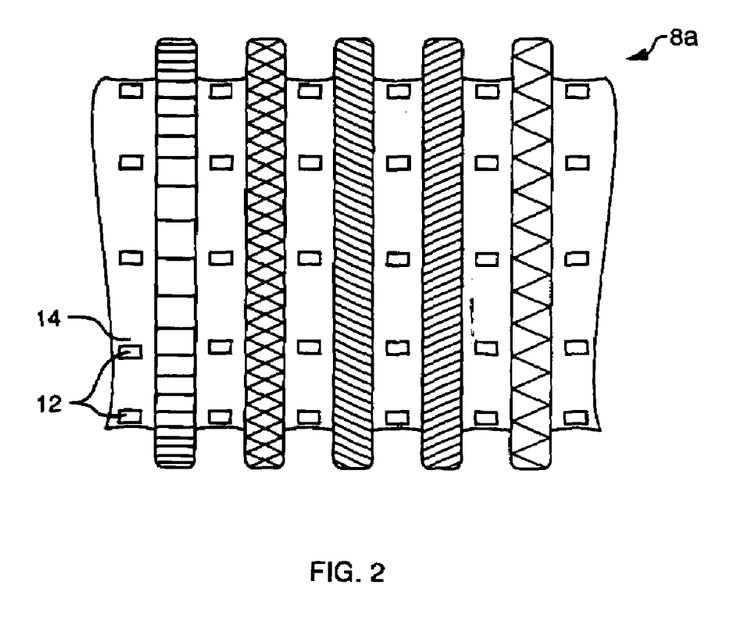
FIG. 2 is a schematic illustration used only to disclose various geometries of dents or detents on the peaks of the pipe and further illustrating that the skimmer tabs/perforations in the valleys are substantially slots the long side may be radially or axially directed.
Figure 3:
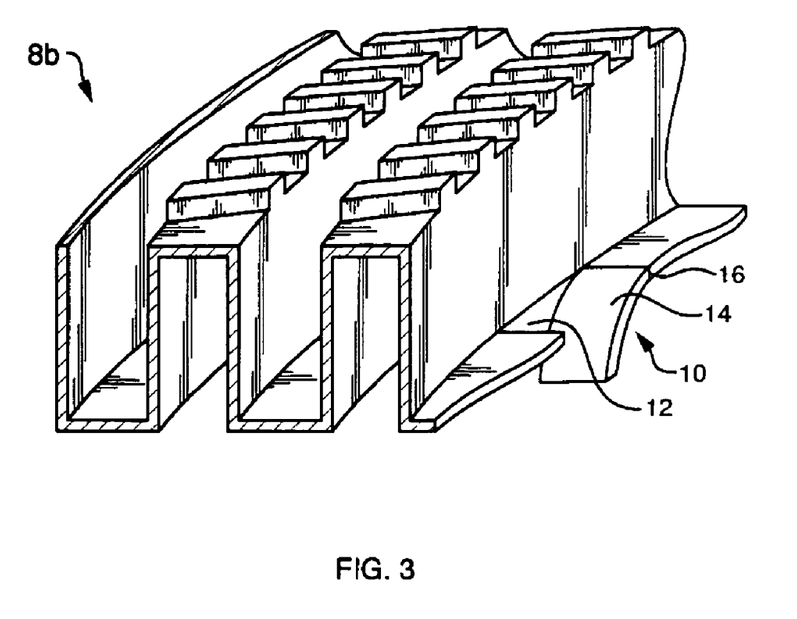
FIG. 3 is a top angled cut-off perspective view of a typical geometry of the specially configured corrugated pipe or conduit showing the details of the peaks and the valleys of the pipe detailing the relationship between the ridges, the channels between the ridges and the grooves having almost perpendicular side walls, showing also the skimmer tabs/perforations cut into the bottom of the grooves and the single or multiple layer fabric which is wrapped around the pipe when placed into the ground or leach field.
Figure 4:
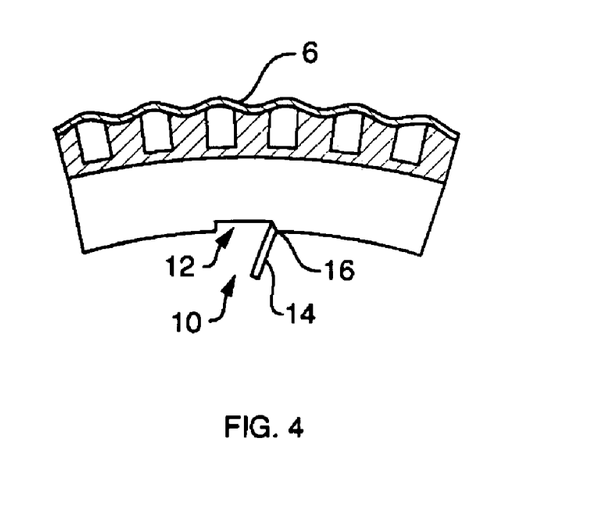
FIG. 4 is a radially directed cut-off cross section view of the pipe of FIG. 3 showing the skimmer tabs/perforations including the illustration of either single or multilayer fabric wrapped around the pipe.
Figure 5A:
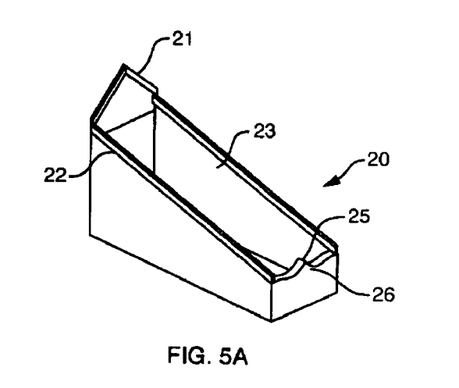
FIG. 5A is a perspective illustration of the perforator/skimmer tab former and each of the features of this embodiment of the tab former such as piercing and cutting 1st edge and 2nd cutting edges, the surface between the 2 cutting edges, the roll surface, the 4th edge or called the rolledge, and a slight v-shaped portion called the v-spreader along the 4th edge/rolledge.
Figure 5B:
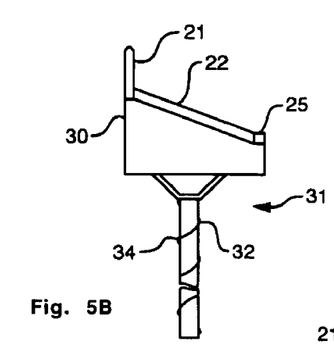
FIGS. 5B, 5C and 5D is a multi-view sketch of the perforator/skimmer tab former which is substantially rectangular in shape showing also the actuator system having actuator shaft and spring.
Figure 5C:
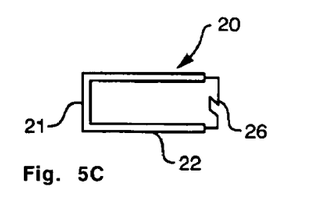
Figure 5D:
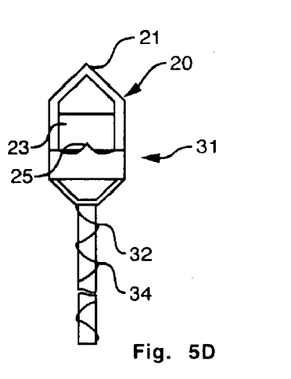

FIGS. 5B, 5C, 5D is a multi-view sketch of the perforator/skimmer tab former which is substantially rectangular in shape. It shows a piercing and cutting 1st edge 21 and two 2nd cutting edges each identified as 22 which cut the plastic. The surface between the 2 cutting edges, the roll surface 23, causes the cut plastic to be pushed or rolled inwardly along the 4th edge or called also the rolledge 26 which 4th edge 26 acts to create hinge edge 16 the cut plastic portion which thereby becomes the so-called skimmer tab. There is a slight v-shaped portion called the v-spreader 25 along the 4th edge/rolledge 26 which tends to "spread" the plastic material in the hinge 16 or attached portion. This slight spreading of the material causes the skimmer tab 14 to stay in position within the pipe 8 or 8A or 8B and relative to the aperture 12 and not tend to move back toward the aperture 12 from which the tab 14 was formed. There is also shown the pipe skimmer actuator system 31. Actuator system 31 is designed having tab formers 20 attached to one end of actuator shaft 34 which is compressed by spring 32 and thereby providing adequate force to cause perforation of the pipe surface and creation of apertures 12.

Figure 6:
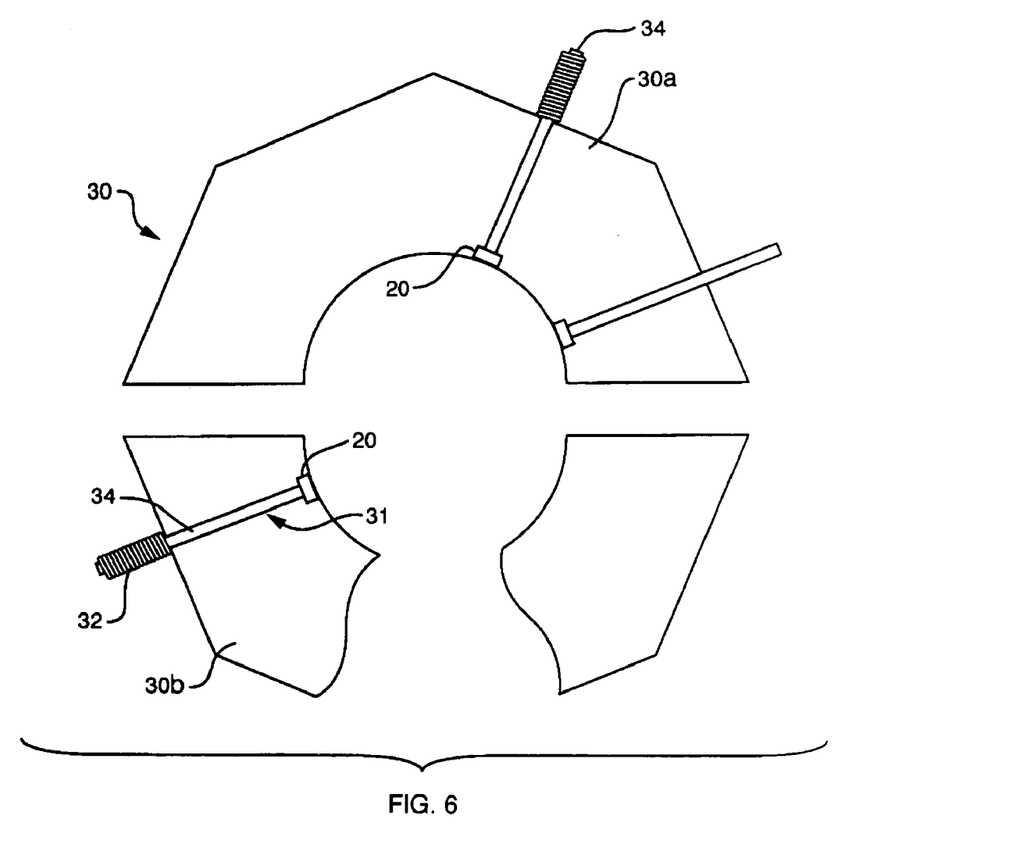
FIG. 6 is a schematic illustration of the invention showing the mold as disassembled into the first and the second mold halves and having a plurality of formers assembled thereto.

FIG. 5A is simply a perspective illustration of the perforator/skimmer tab former 20 and each of the features of this form of the tab former FIG. 6 is a simple schematic illustration, which is fully understood by the ordinarily skilled person who works in the related fields of the invention showing the conduit/pipe forming mold 30 as disassembled into the first and the second mold halves 30A and 30B and respectively and having a plurality of pipe skimmer actuator system 31 which include perforators/skimmer tab formers 20, actuator shafts 34, spring 32 is around shaft 34 which provide controlled pressure and force to skimmer tab former 20 attached thereto. The actuator shaft 34 attached to the skimmer tab 20 and is configured onto mold 30 and positioned to create the pipe aperture skimmer 10 when pressure and force is provided to the shaft 34 or pipe skimmer actuator system.

Additionally, as noted above, the present invention ideally works in conjunction with other inventions of the present inventor as disclosed for example in issued U.S. Pat. Nos. 5,954,451 and 6,461,078 which are incorporated herein by reference in their entirety. Thus, the present invention also provides an apparatus for use within a drainage field, which drainage field may be in combination with disposal and irrigation systems used in treatment of fluids and dispersal of fluids, and provides methods and devices for quickly and economically perforating any type of conduit for use in any application that benefits from perforated conduit.

It is thought that the present invention, the method, apparatus and actuatable perforator/skimmer tab former for perforating pipe during the process of extrusion and the pipe produced thereby is understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

What is claimed is:

1. A perforator/skimmer tab former having a plurality of edges and surfaces each edge of said plurality of edges being configured each relative to each other edge and each surface configured in relative position and geometry with each of said edges, said perforator/skimmer tab former comprising:
    said plurality of edges having a first edge, a fourth edge and two second edges, said first edge and said fourth edge being substantially at two opposing positions and said first edge elevated above said fourth edge, each of said two second edges substantially opposing each other and with the one end of each contacted with said first edge and the other end of each contacted with said fourth edge and wherein said first edge is the first cutting edge, each of said two second edges being the second cutting edges and said fourth edge being the roll edge, said first edge, when in use is advanced into said plastic within a valley region, and pierces and cuts through the material along one said edge and as said perforator/skimmer tab former is further advanced, each of said two second edges cause cuts and at the same time the plastic material within the cut region is pressed and rolled into the interior of the conduit by a roll surface while being substantially attached or hinged as a consequence of said actuatable perforator/skimmer tab former which may be sequentially and timely actuated to cause the perforation of the wall of pipe to be hinged along one edge particularly along the fourth edge called the roll edge; and
    said roll surface causing the rolling of said material being pierced and cut, having four ends and each of said four ends being substantially in contact with one portion of said edges, said rolling being directed into the interior region of said conduit being created with aperture/skimmer tabs, which said perforator/skimmer tab former, upon activation causes the creation of said aperture/skimmer tab as part of a conduction component for a leach processing system.

2. The perforator/skimmer tab former according to claim 1 wherein said fourth edge further comprises thereon a v-shaped portion called a v-spreader along said fourth edge which causes an amount of spreading of the plastic thereby inhibiting said skimmer tab from tending to move back toward said aperture of said aperture/skimmer tab from which said skimmer tab was created.

3. The perforator/skimmer tab former according to claim 2 further comprising means for being configured and controlled within a pipe skimmer actuator system for creating a cylindrical conduit or pipe for use in leaching systems, said means for being configured and controlled being an actuator shaft and spring assembly and means for attaching said actuator shaft and spring assembly to said perforator/skimmer tab former.

4. The perforator/skimmer tab former according to claim 1 further comprising means for being configured and controlled within a pipe skimmer actuator system for creating a cylindrical conduit or pipe for use in leaching systems, said means for being configured and controlled being an actuator shaft and spring assembly and means for attaching said actuator shaft and spring assembly to said perforator/skimmer tab former.

* * * * *